United States Patent Office 3,582,390
Patented June 1, 1971

3,582,390
METHOD OF METALLIZING PHOSPHOR SCREENS USING AN AQUEOUS EMULSION CONTAINING HYDROGEN PEROXIDE
Theodore A. Saulnier, Lancaster, Pa., assignor to RCA Corporation
No Drawing. Filed Sept. 17, 1968, Ser. No. 760,364
Int. Cl. H01j 31/20
U.S. Cl. 117—35                                    7 Claims

ABSTRACT OF THE DISCLOSURE

A method for metallizing a phosphor screen for a cathode ray tube including the steps of producing upon the surface of the phosphor screen a volatilizable substrate from an aqueous emulsion of a water-insoluble, film-forming resin, depositing a metal layer upon the substrate, and then volatilizing the substrate. In the disclosed method, the aqueous emulsion contains minor amounts of hydrogen peroxide and a water-soluble, film-forming organic polymer. Other additives, such as colloidal silica, may be present in the emulsion.

BACKGROUND OF THE INVENTION

A process for metallizing a phosphor screen for a cathode ray tube is described in U.S. Pat. No. 3,067,055 to Theodore A. Saulnier, Jr. That process includes the steps of coating the screen with an aqueous emulsion of an acrylate resin copolymer, heating the coating to produce a dry volatilizable substrate, depositing a layer of metal upon the surface of the substrate, and then volatilizing the substrate. As used herein, the combination of steps which are used for producing the substrate is referred to as "filming," and the emulsion used for this purpose is called the "filming emulsion." The step of volatilizing the substrate is referred to as "baking-out."

Phosphor screens which are to be metallized, particularly mosaic screens for color television picture tubes, can vary in character due to differences in the phosphors, the screen weights, the binder contents and the methods of application that are used. Accordingly, it is desirable to use an aqueous filming emulsion that can accommodate to the variations in screen character and texture without unduly compromising the quality of the substrate produced. The emulsion should be easily applied by semi-automatic and automatic process equipment.

After the substrate is metallized, substantially all of the organic material between bulb glass and the metal layer is removed during the baking-out step. During baking out, the metallized screen is heated at about 375° to 450° C. in order to volatilize the organic materials. It is essential during baking-out that there is sufficient porosity in the metal layer to permit the gasses formed from the organic materials to escape without conspicuous movement or blistering of the metal layer that is deposited on the phosphor screen. Blistered metal films over the phosphor areas exhibit an uneven reflectance of the luminescence and also may provide a source of loose metal particles in the tube.

Some of the organic materials of the filming emulsion usually coat some bare glass areas adjacent to the phosphor screen. It is desirable that the metal layer over bare glass areas also exhibits a minimum of blistering. Loose metal particles formed from ruptured blisters can be a source of electrical short circuits between elements of the electron guns used in the cathode ray tubes. In addition, the substrate should submit to some easily applied trimming technique to minimize blistering of the metal layer in heavy bead deposits and preferably have a built-in property to obviate the need for the trimming step in areas close to the screen.

It has been suggested previously to include in the filming emulsion minor amounts of silica, a soluble silicate, and/or a boric acid complex of polyvinyl alcohol. These additional constituents are added to improve the adherence and to reduce the peeling and blistering of the metal layer over the bare glass areas adjacent the phosphor screen. However, in the previous processes, the amount of resin solids that may be deposited from the emulsion without producing blisters in the metal film is limited. Nevertheless, greater amounts (thicker layers) of resin solids over the phosphor screens are desirable because they produce metallized screens with improved light output. Furthermore, alternative resins are desirable because they permit better tailoring of the process to the desired product.

SUMMARY OF THE INVENTION

The novel process for metallizing a phosphor screen for a cathode ray tube, as in previous processes, includes the steps of coating the screen, either dry or wet, with an aqueous emulsion of a water-insoluble, film-forming resin, drying the coating to produce a volatilizable substrate, depositing a layer of metal upon the surface of the substrate, and then volatilizing the substrate. In the novel process, the emulsion contains minor amounts of hydrogen peroxide and a water-soluble polymer in the water-based emulsion greater amounts of acrylate resins may be used to produce metallized screens with greater light output. And, other resins may be used in place of acrylate resins.

It is believed that the porosity of the metal layer is regulated by the amount of hydrogen peroxide which is included in the emulsion, whereby the tendency of the metal layer to blister over the phosphor screen area during the baking-out step is reduced. By including hydrogen peroxide in the mixture, many emulsion compositions which otherwise produce blistered metal films on the phosphor screen and/or the bare glass areas can now be used. The addition of hydrogen peroxide to the emulsion extends the choice of kinds and amounts of emulsion resins which are acceptable in the metallizing process and of the kinds and amount of film-forming additives which can be used for optimizing the characteristics of the process and product thereof.

In practice, both the filming and the baking-out steps are better and more easily controlled. The novel method is especially advantageous in automated processes because the process parameters are less critical. Also the novel process permits a better tailoring of the method to the factory conditions that are encountered.

DESCRIPTION OF THE PREFERRED EMBODIMENTS

In all of the examples, the slurry technique is employed to apply the emulsion to a dry tricolor mosaic screen for a color television picture tube. This screen consists of phosphor dots arranged in a hexagonal pattern on the surface of a glass faceplate. The phosphor screen is comprised of dots of a blue-emitting phosphor (e.g., zinc sulfide activated with silver); dots of a green-emitting phosphor (e.g., zinc cadmium sulfide activated with copper and aluminum); and dots of a red-emitting phosphor (e.g., yttrium oxysulfide activated with europium). The dots contain about 8 to 24 percent of a light-hardened binder comprised principally of polyvinyl alcohol and acrylate copolymers.

Starting with a rectangular 25-inch screened faceplate panel or cap for a color television picture tube, the procedure is as follows:

(1) Place the screened faceplate panel open end up upon an automatic slurry spinner. The slurry spinner is similar in function to the one described in U.S. Patent No. 2,902,973 to M. Weingarten et al.

(2) Preheat the dried screened panel to about 40–46° C. with radiant heaters with the panel open end up and about horizontal (referred to herein as about a 0° angle).

(3) Start slow rotation (about 20 r.p.m.) and while the rotation continues dispense about 100 milliliters of the filming emulsion onto the central area of the phosphor screen surface without producing foam or bubbles.

(4) Continue rotation at about 15 to 22 r.p.m. and tilt the cap to about 15 to 18° from horizontal to cause the emulsion puddle to spiral over the screen surface to the cap edge without leaving dry areas.

(5) Slow the cap rotation to about 7.5 to 8.5 r.p.m. in order to coat the corners of the rectangular panel while the cap is tilted at about 15° to 18° from horizontal.

(6) Once the panel corners are coated, tip the cap quickly (about 3 to 6 seconds) to an angle of 90° to 110° with the horizontal while rapidly accelerating the cap rotation to a high speed to throw off excess emulsion from the cap and to level the coating. A speed of about 120 r.p.m. is effective for this purpose.

(7) Slow the cap rotation to about 50 r.p.m. for about 15 seconds and then to about 30 r.p.m. for about one second. During this latter slower rotation, apply radiant heat to dry the coating on the phosphor screen and to form the substrate.

(8) Direct a jet of water so as to rinse only the excess coating off the sidewalls of the faceplate panel during the drying cycle and/or before the substrate is formed. Then, dry the sidewalls.

(9) Remove the cap from the spinner and place it screen side down on a metallizing apparatus. Then, evaporate aluminum metal in vacuum upon the substrate.

(10) Remove the faceplate from the metallizing apparatus and continue the normal processing including a subsequent step of making the faceplate panel in air at about 420° C. to volatilize the substrate and to leave the aluminum metal layer upon the phosphor screen.

The filming emulsions for the novel process are aqueous emulsions of water-insoluble, film-forming resins to which have been added minor amounts of hydrogen peroxide, a water-soluble film-forming polymer and optionally one or more other additives. The filming emulsion formulations for the specific example described below may be prepared with the following stock solutions:

Solution A—An aqueous emulsion containing about 38 weight percent of an acrylate resin copolymer dispersed in water and having a pH of about 2.9. One such emulsion is Rhoplex B-74 (marketed by Rohm & Haas Co., Philadelphia, Pa.). This emulsion has an average particle size of about 0.1 micron.

Solution B—An aqueous solution containing about 2 weight percent of a boric acid complex of polyvinyl alcohol. One such solution may be prepared by mixing a sufficient quantity of Unisize HA70 (marketed by Air Reduction Company, New York, N.Y.) with water to provide the required concentration.

Solution C—An aqueous solution containing about 30 weight percent hydrogen peroxide.

Solution D—An aqueous solution containing about 30 weight percent of colloidal silica particles. One such solution is sold commercially under the name Ludox AM (marketed by E. I. du Pont de Nemours, Wilmington, Del.). The particles in this solution have an average particle size of about 15 millimicrons.

EXAMPLE 1

Mix 237 grams Solution A with 248 grams of water. Then, while mixing, add successively 10 grams Solution C and 15 grams Solution D. Then, add sufficient ammonium hydroxide (about 28% $NH_4OH$) to adjust the pH of the final mixture to about 6.0 to 7.5, preferably about 7.2. Then, add 90 grams Solution B. The filming emulsion is now used in the procedure set forth above.

The major solids constituent of the aqueous emulsions used in the novel methods is a water-insoluble, film-forming resin which can be volatilized by heating at temperatures up to about 500° C. The resins are relatively hard and thermoplastic. The preferred resins of this type consist essentially of acrylate resin copolymers. By "acrylate resin copolymers" is meant copolymers which are constituted of combinations of alkyl acrylates, alkyl methacrylates, acrylic acid, methacrylic acid, and similar acrylate type monomers. Some suitable commercial aqueous emulsions of acrylates from which the filming emulsions can be made are marketed by Rohm & Haas Co., Philadelphia, Pennsylvania under the trademark Rhoplex and under the designations of B–74 (pH 2.5–3.0), B–85 (pH 9.5–10.0), C–72 (pH 7.5–8.0), and D–70 (pH 6.2–7.0). The concentration of water-insoluble resin in the filming emulsion may be in the range of about 5 to 20 weight percent of total weight of the emulsion.

A plasticizer may be used with the acrylate resin copolymer for the purpose of adjusting the hardness and film-forming characteristics of the substrate formed from the emulsion. Most of the usual plasticizers for acrylate copolymers may be used for this purpose. Some suitable plasticizers are dibutyl phthalate, butyl glycolate, methyl phthalate, tri-butoxyethyl phosphate, and ethyl glycolate. The content of plasticizers may be in the range of 0 to 10 weight percent of the weight of acrylate copolymer.

Other water-insoluble resins which can be used are polyvinyl acetate resins, styrene-acrylic-acrylonitrile resins and styrene-acrylate resins. Some examples of suitable commercial aqueous emulsions of these resins are:

Polyvinyl Acetate Darex-Everflex MF made by Dewey Almy Chemical Co., Cambridge, Mass.

Styrene-Acrylic-Acrylonitrile 40–408 Synthemul made by Reichhold Chemicals, Inc., White Plains, N.Y.

Styrene-Acrylic 40–220 Synthemul made by Reichhold Chemicals, Inc., White Plains, N.Y.

A suitable plasticizer may be used with polyvinyl acetate resins, styrene-acrylic-acrylonitrile and styrene-acrylate resins.

Hydrogen peroxide is included in the filming emulsion in an amount of 0.1 to 4.0 weight percent of the total weight of the emulsion. The hydrogen peroxide may be added in any strength convenient for handling. Usually a 30 to 35 weight percent solution obviates the need for intermediate dilution before addition to the emulsion.

A function of the hydrogen peroxide is to regulate the porosity of the substrate and of the metal layer. With no hydrogen peroxide present, the processing cycle must be adjusted so that the substrate crazes and pinholes across the surface of the phosphor dots in a somewhat random manner. In optimum practice of the novel method, the presence of hydrogen peroxide in combination with the water-soluble, film-forming polymer causes the crazing and pinholing to occur overwhelmingly along the periphery of phosphor dots and between the phosphor dots. Very little crazing and pinholing occurs across the surface of the dots. In less than optimum practice, more crazing and pinholing occurs across the surface of the dots.

One consequence is that more luminescent light from the dots is radiated to the viewer resulting in brighter images to the viewer. Another consequence is an increase in the average porosity of the substrate, and therefore of the metal layer, without corresponding loss in brightness to the viewer. With increased porosity, more materials and greater amounts of materials can be used in the filming emulsion. Thus, the emulsion can be better tailored to the process, and the process parameters are less critical and therefore easier to control.

The water-soluble, film-forming polymer is included in the filming emulsion in an amount of about 0.5 to about 7.0 weight percent of the resin solids present in the emulsion. The term "water-soluble" is intended to include water-dispersible polymers. The polymer is relatively soft and is volatilized by heating at temperatures up to about 500° C. It may or may not be thermoplastic.

The water-soluble, film-forming polymer appears to aid in localizing the pinhole and crack-forming action around the dots during the formation of the substrate for the aluminum layer, and aids in maintaining film integrity over the surface of the dots. Localizing the crack and pore formations imparts a substantial resistance to blistering of the metal film during the subsequent baking-out step. This resistance to blistering occurs when concentrations of 0.5 to 7.0 weight percent of the water-soluble resin solids are present in the emulsion. Higher concentrations may be used but these higher concentrations modify the flow properties of the filming emulsions. High concentrations also adversely affect the specular properties of the metal layer deposited over the substrate without significantly improving the blister resistance of the substrate and metal layer.

Some suitable water-soluble polymers are gelatin, polyvinyl alcohol, methyl cellulose, hydroxyethyl cellulose, and glue. Any of these materials when included in the indicated concentration will produce screens which are substantially free of blisters over the screen area. Additionally, blistering which occurs in the radius between the face and the wall of the panel is reduced or eliminated when polyvinyl alcohol (preferably hydrolyzed 97% and higher) or a boric acid complex of polyvinyl alcohol (preferably hydrolyzed 97% and higher) is used.

It is preferred to use a boric acid complex of polyvinyl alcohol. Such a boric acid complex may be produced by reacting boric acid with polyvinyl alcohol in an acidic medium having a pH lower than about 5.5. In a typical preparation, an aqueous solution of boric acid is added to a 7 percent solution of polyvinyl alcohol hydrolyzed to 97% or higher and buffered to less than pH 5.2, preferably to about pH 4.5, with an acid such as citric acid, crotonic acid, phosphoric acid, or an acid salt. The mixture is heated at about 160 to 210° F. and then cooled. The product may be diluted to stock concentration or may be extracted as a dry powder. Some other preparations of suitable boric acid complexes of polyvinyl alcohol are described in U.S. Patent No. 3,135,648 issued June 2, 1964 to Raymond L. Hawkins. Some boric acid complexes of polyvinyl alcohol suitable for use in the novel processes are commercially marketed by Air Reduction Chemical and Carbide Company, New York, N.Y. under the trade names Unisize HA-70 and Tackified Polyvinyl Alcohol M-51, MM-81, Vinol MH-82, Vinol SH-72, SM-53 and SM-73.

In the novel method, the filming emulsion preferably has a pH in the range of 4.0 to 8.0. Where the emulsion ordinarily has a pH below this range, the pH may be raised by mixing into the emulsion a neutralizing reagent or a combination of neutralizing reagents. Solutions of sodium hydroxide, potassium hydroxide, and other inorganic alkali salts can be used where it is preferred to use a reagent that does not greatly increase the resistance of the substrate to pyrolysis, and does not increase the inert ash residue in the screen. Ammonium hydroxide and morpholine have been found very satisfactory for adjusting the pH of an emulsion made with Rhoplex B-74. This is particularly effective for metallizing screens that are too hydrophobic to wet adequately in very short time cycles or automatic and semiautomatic manufacturing equipment.

An ammonium hydroxide-neutralized emulsion works well in a pH range of about 6.5 to 7.5. Higher pH's give satisfactory but not optimum coatings because the higher alkalinity leads to some swelling of some of the emulsion particles and complications in the drying step.

A morpholine-neutralized emulsion performs best in a pH range of about 4.0 to 4.5. At higher pH's, the emulsion appears to be swollen and/or partially plasticized by the increased morpholine content. The results suggest that other suitable amines or neutralizing reagents are useful under these and other pH ranges with optimum results.

Colloidal silica may be included in the filming emulsion in an amount up to about 20 weight percent of the resin solids present in the emulsion. The preferred range is about 1 to 10 weight percent. The silica may be in the form of an aqueous suspension with particles having an average particle size of about 15 millimicrons. Some suitable colloidal silica suspensions are available commercially under the name "Ludox" marketed by E. I. du Pont de Nemours, Wilmington, Del. The colloidal silica has the effect of reducing the peeling of the metal silica layer from bare glass areas during the baking-out step. It also reduces blistering of the metal layer during the baking-out step to some extent. Where more than 20 weight percent of silica is added, the substrate leaves behind a residue which interferes excessively with the excitation process of the phosphor in the screen.

Soluble silicate may be included in the filming emulsion in an amount up to about 2 weight percent of the weight of water-insoluble resin solids present in the emulsion. The preferred range is about 1 to 2 weight percent. Some useful silicates are sodium silicate, potassium silicate, and lithium silicate. The ratio of silica to cation in the soluble silicate is preferably in the range of about 2.0 to 4.0. Some suitable soluble silicates are availabile commercially under the trade name Kasil marketed by Philadelphia Quartz Company, Philadelphia Pa. The soluble silicate has the effect of reducing the peeling of the metal layer from bare glass areas after the baking-out step. It also reduces to some extent the blistering of the resin film during the baking-out step. Also, the soluble silicate may be alkaline and, when that is the case, it may function as a neutralizing agent. Where more than 2 weight percent of soluble silicate is added, the resin films may exhibit a reduced gloss resulting in metal layers with poorer specular properties.

The novel filming emulsions generally have satisfactory shelf life. Many have been used with good results after four days. Mild agitation of the emulsion may be desirable during the time interval between mixing and use.

The novel filming method may be applied to any phosphor screen structure including structured screens such as dot screens and line screens, and unstructured screens such as monochrome screens and penetration screens. Structured screens may include nonluminescent areas such as guard bands or other masking structures. The novel filming method may be applied to phosphor screens comprised of any phosphor or combination of phosphors, and to phosphor screens which have been fabricated by any screening process. Thus, the novel method may be applied to screens which have been fabricated by a dusting technique, a slurry technique, a settling technique, etc. The screen deposition technique may include the use of a photopolymer which is insolubilized or which is solubilized upon exposure to light or to electrons. In the case of phosphors deposited by the slurry direct photographic process, the filming emulsion may be applied over phosphor elements deposited from slurries containing, e.g., 12 to 26 weight percent phosphor solids and a ratio of polyvinyl alcohol to phosphor solids of about 0.09 to 0.40. The emulsions can be used to film phosphor screens prepared with slurry compositions disclosed in U.S. Patent No. 3,269,838 granted to T. A. Saulnier, Jr.

The water-based filming emulsion described herein may be applied to either a wet or a dry phosphor screen in any of several ways, for example, by spraying, hosing, or slurrying. In applying a film of the emulsion over the screen surface, it is usually advantageous to apply a spinning motion to the screen during and after application of the emulsion in order to spread the material over the screen surface and to remove the excess emulsion. During heating and drying a speed of rotation up to about 120 r.p.m. can be used to adjust the spreading and the draining of the emulsion to achieve the substrate thickness and uniformity desired with the screen and the emulsion that is being used.

When the filming emulsion is to be applied directly to a wet phosphor screen, the water content of the screen is such that the binder holding the phosphor particles in the phosphor screen is preferably fully swelled with water but surface water is nearly all drained off. Generally, the lower the water content of the screen, the less emulsion will be diluted. Accordingly, when coating wet phosphor screens, the resins content of the filming emulsion should be adjusted to a somewhat higher concentration than for dry screens.

In applying the filming emulsion to the screen surface by the slurry technique, the emulsion is spread over the screen with a puddle of emulsion traveling in a spiral as the concave surface of the screen panel rotates and tilts from near horizontal (0–5° angle) to a 15° to 18° angle. It is then tilted quickly to an angle of about 85° or more in order to spin-off the excess emulsion while drying the emulsion to a nearly complete film with infrared heaters.

In practice, the emulsion wets the screen surface readily, and fills the screen pores or capillaries so that, upon heating and drying, the emulsion solids form a film. Some of the resin emulsion solids are deposited over the phosphor elements due to imbibition of water from the emulsion. The presence of the water-soluble polymer enhances this step. Variations in the texture and the size of the capillaries across the phosphor screen may require adjustment of the filming cycle and emulsion solids to optimize the performance of the filming step.

In making substrates with emulsions which have a "minimum film-forming temperature" above room temperature, sufficient heat should be applied to cause the coating to dry rapidly in order to accumulate emulsion solids over the phosphor area, and to heat the screen, the screen support surface, and the emulsion coating to a temperature that will cause film formation. In practice, the measured film-forming temperature for the system depends on the particular room environment, developing water temperature for the last application of phosphor, resin emulsion concentration, and the "minimum film forming temperature" of the resin. It is usually easiest to approach the film-forming temperature from the low temperature side, then to apply a large enough change in the heating rate or duration of the heat to arrive at a significant change in the apparent cap surface temperature just before the emulsion coating changes from a wet (low gloss) to a dry (no gloss) appearance.

After the deposition of an evaporated aluminum layer of 2000 to 8000° A., the substrate can be examined by transmitted light with 10–50× magnification in order to check the porosity of the aluminum film. See "Emulsion Film for Color-Television Screens," T. A. Saulnier, Electrochemical Technology, vol. 4, No. 1–2, pages 31–34, (1966). In the case of three-dot color screens, an underheated film will show full mosaic crazing or small cracks due to crazing over one or more phosphor dot elements. In this case, the degree of heating during filming is increased until the last color element only shows around its periphery and occasional cracks, but only pinholes of small to very small size over its surface. Usually the screen surface texture precludes easy measurement of the pinhole size. However, the limit of low screen porosity can be quickly and decisively determined by "baking-out" the screen to determine whether or not any "blistering" of the aluminum is shown. This can be judged by the noticeable movement or change in aluminum film surface texture over the phosphor screen after bake-out.

Following filming, the substrate is metallized in a manner similar to that previously described; for example, in Pats. 2,903,377, 3,067,055, and 3,177,389 each issued to T. A. Saulnier, Jr. Briefly, one method consists of fixing short lengths of aluminum metal to a tungsten filament, placing the filmed screen above the filaments, evacuating the chamber between, and then evaporating the aluminum, which deposits as a metal layer on the film. Subsequently, the metallized substrate is baked in air at about 400 to 440° C. During this baking, organic matter in the screen and in the substrate is completely volatilized and the metal layer adheres to the phosphor screen. After baking-out, a small amount of inorganic residue is usually left by the substrate. The source of some of this residue may be the additives in the novel filming emulsions. Following baking-out, the cap with the metallized phosphor screen thereon is assembled with other structures into a cathode ray tube. Alternatively, the unbaked screen may be assembled with other structures first and then baked-out as described above to volatilize any organic matter in the screen and in the substrate.

The following examples of filming emulsions have been used in the novel method:

EXAMPLE 2

| | Grams |
|---|---|
| Rhoplex B74 (38% solids) | 197 |
| Water | 133.5 |
| Ludox AM (30% solids) | 12.5 |
| Hydrogen peroxide (35%) | 8.4 |
| Vinol 165 solution (2%) | 150 |
| Ammonium hydroxide (28%) to pH 6.8–7.2. | |

EXAMPLE 3

The formulation of Example 2 containing also a polyvinyl alcohol precipitant, such as sodium carbonate and sodium sulfate, in amounts up to 100% of the Vinol 165. These formulations were judged equivalent to the formulation of Example 2 with respect to localization of pinholes and cracks. Other precipitants and gelling agents new or old in the art can be included with highly hydrolyzed polyvinyl alcohols, gelatin and other reactive water-soluble film-forming agents.

EXAMPLE 4

| | Grams |
|---|---|
| Synthemul 40–408 emulsion (40% solids) (styrene-acrylic-acrylonitrile heteropolymer) | 225 |
| Water | 171.45 |
| Ludox (30% solids) | 15 |
| 35% hydrogen peroxide | 8.55 |
| Unisize HA70 (2% solids) | 180 |
| Ammonium hydroxide to pH 6.8–7.2. | |

EXAMPLE 5

| | Grams |
|---|---|
| Rhoplex B74 (38% solids) | 158 |
| Water | 283.45 |
| 300 Bloom gelatin (2% solution) | 150 |
| 35% hydrogen peroxide | 8.55 |

What is claimed is:
1. A method of metallizing a cathode ray tube screen including the steps of:
   (1) coating said screen with a water-based emulsion of a water-insoluble, film-forming resin which is substantially entirely volatilized by heating at temperatures up to about 500° C., said emulsion containing about 0.1 to 4.0 weight percent of the total weight of the emulsion of hydrogen peroxide and about 0.5 to about 7.0 weight percent of the resin solids present in the emulsion of a water-soluble, film-forming polymer which is substantially entirely volatilized by heating at temperatures up to about 500° C.,
   (2) drying said coating to produce a volatilizable substrate,
   (3) depositing a layer of metal upon said substrate and then
   (4) volatilizing said substrate.
2. The method claimed in claim 1 wherein said water-insoluble resin is an acrylate resin copolymer.
3. The method claimed in claim 1 wherein said water- insoluble resin is a polyvinyl acetate resin, a styrene-acrylic-acrylonitrile resin or a styrene-acrylate resin.

4. The method defined in claim 1 wherein said water-soluble polymer is selected from the group consisting of polyvinyl alcohols, boric acid complexes of polyvinyl alcohol, gelatins, methyl cellulose, hydroxymethyl cellulose and glues.

5. The method defined in claim 1 wherein said water-based emulsion contains up to 20 weight percent of colloidal silica, with respect to the weight of said water-insoluble resin.

6. The method defined in claim 1 wherein said screen is coated with a water-based emulsion containing, in percent of the total weight of said emulsion:
    6 to 20 percent of a polyvinyl acetate resin, an acrylate resin, a styrene-acrylate resin, or a styrene-acrylic-acrylonitrile resin and
    0.1 to 4.0 percent hydrogen peroxide;
and containing, in percent of the weight of said resin:
    0.5 to 7.0 percent of a water-soluble or water-dispersible polyvinyl alcohol, a boric acid complex of polyvinyl alcohol or a gelatin, and
    0.0 to 20.0 percent of colloidal silica.

7. The method defined in claim 6 wherein said coating is produced from a water-based emulsion containing in percent of the total weight of said emulsion:
    about 15 percent of an acrylate resin,
    about 0.5 percent hydrogen peroxide,
and containing in percent of the weight of said acrylate copolymer
    about 4 percent of a boric acid complex of polyvinyl alcohol,
    about 5 percent colloidal silica.

References Cited
UNITED STATES PATENTS
3,067,055  12/1962  Saulnier  96—36.1UX ALFRED L. LEAVITT, Primary Examiner W. F. CYRON, Assistant Examiner U.S. Cl. X.R.
117—33.5

UNITED STATES PATENT OFFICE
CERTIFICATE OF CORRECTION

Patent No. 3,582,390          Dated June 1, 1971

Inventor(s) Theodore A. Saulnier

It is certified that error appears in the above-identified patent and that said Letters Patent are hereby corrected as shown below:

Column 2, line 28, after "water-soluble" insert -- , film-forming organic polymer. By including minor amounts of hydrogen peroxide and a water-soluble --. Column 3, line 39, "making" should read -- baking --. Column 6, line 34, after "agent" insert -- In this role it may be the sole neutralizing agent in the filming emulsion or may be used in combination with another neutralizing agent. --.

Signed and sealed this 9th day of November 1971.

(SEAL)
Attest:

EDWARD M. FLETCHER, JR.          ROBERT GOTTSCHALK
Attesting Officer                Acting Commissioner of Patents